Nov. 6, 1923.  1,473,168
S. G. WINGQUIST
CAGE FOR ROLLER BEARINGS
Original Filed Sept. 9, 1919

*Fig. 3.* *Fig. 6.* 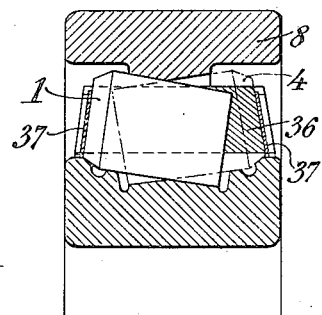
*Fig. 8.*

*Fig. 12.* *Fig. 10.* *Fig. 11.* 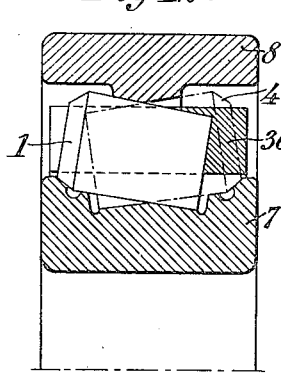 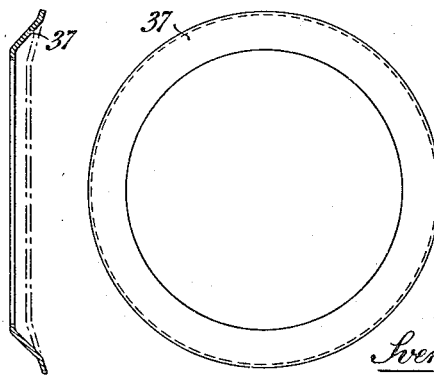
Inventor
Sven Gustaf Wingquist,
By Attorneys,
Fraser, Durk & Myers Patented Nov. 6, 1923.

1,473,168

UNITED STATES PATENT OFFICE.

SVEN GUSTAF WINGQUIST, OF GOTTENBORG, SWEDEN, ASSIGNOR TO AKTIEBOLAGET SVENKA KULLAGERFABRIKEN, OF GOTTENBORG, SWEDEN, A CORPORATION OF SWEDEN.

CAGE FOR ROLLER BEARINGS.

Original application filed September 9, 1919, Serial No. 322,753. Divided and this application filed December 6, 1921. Serial No. 520,400.

*To all whom it may concern:*

Be it known that I, SVEN GUSTAF WINGQUIST, a subject of the King of Sweden, residing at Gottenborg, in the Kingdom of Sweden, have invented new and useful Improvements in Cages for Roller Bearings (for which I have filed an application in Sweden September 3, 1918, and have been granted a patent, No. 54,896, on June 14, 1923), of which the following is a specification.

This invention provides a cage for roller bearings of the character set forth in application Serial No. 322,753, filed September 9, 1919, of which the present application is a division.

According to this invention, the rollers of one row bear at one race-ring or at both race-rings against track surfaces, preferably conical in shape, and which may vary in width, and alternating with track surfaces (preferably conical in shape and converging in opposite direction to those above mentioned) for supporting the rollers of another row, whereby it is possible to use rollers having a great length relatively to the width of the bearing. The rollers are, preferably, conically shaped and the races as well as the rollers should have the apex of their conical surfaces situated on the axis of rotation of the bearing, thus securing a theoretically exact rolling movement. This construction will thus give a roller bearing which is able to carry great radial loads with small friction while automatically effecting an equal distribution of said loads on both of the rows of rollers, said roller bearing being further adapted to sustain great end-thrust loads in either direction. Moreover, the said construction of the bearing permits the filling in of the above rollers without the use of divided rings and provides a safe guide for the rollers in lateral direction.

In the accompanying drawings several forms of roller bearings embodying this invention are shown.

In the drawings,—

Fig. 3 is a plan of another embodiment of the roller cage;

Fig. 6 shows in section a further modified form of the roller cage.

Fig. 8 shows an embodiment of the bearing similar to that shown in Fig. 1, but having a roller cage formed by a solid ring with a sheet metal cover for retaining the rollers;

Figs. 10 and 11 show one of the sheet metal covers in central section and in elevation respectively;

Fig. 12 shows a similar construction to Fig. 8, but without the sheet metal cover.

Figure 1:
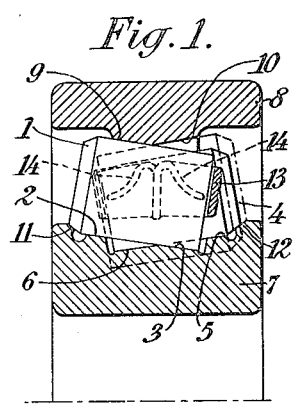
Figure 1 shows an axial section of one embodiment of the bearing in which the rollers bear with both ends against the inner race-ring and between their ends against the outer race-ring.
Figure 4:
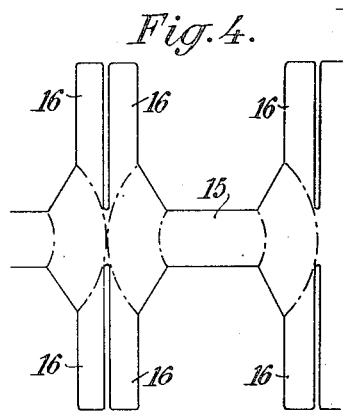
Fig. 4 shows the sheet metal blank of the roller cage shown in Fig. 3, preparatory to the pressing action.
Figure 5:
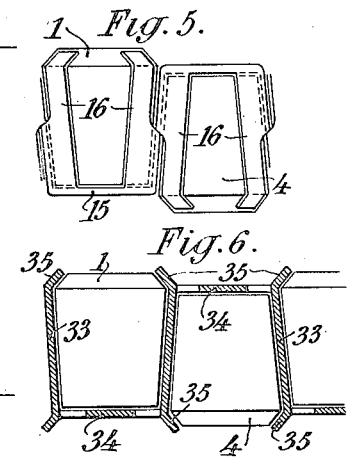
Fig. 5 is a plan of a modified form of the roller cage shown in Fig. 3.

In the bearing shown in Fig. 1, the rollers 1 of one row of rollers rest at their ends on conical surfaces 2, 3, while the rollers 4 of the other row of rollers rest at their ends on conical surfaces 5, 6 formed on the inner ring 7. As regards the outer ring 8, the rollers between their ends bear against conical races 9 and 10. The rollers of the two rows also rest at their larger ends on side flanges 11, 12, respectively, formed on the inner ring and serving to prevent displacement of the rollers within the bearing. The roller cage 13 consists, preferably, of an annular folded ribbon, the folds of which serve to receive the rollers which will engage the folds with their smaller ends while being free at their larger ends (see also Fig. 2). Extending from one, preferably the outer, edge of said ribbon, or from both edges thereof, are tongues or laps 14 bent downwardly between the rollers to form auxiliary supporting means therefor. In the embodiment shown in Fig. 3 the rollers are partly embraced by the roller cage 15 and the laps 16 thereof, the latter being formed by projections of a sheet metal ring, as shown in Fig. 4. In the modified embodiment shown in Fig. 5 the said laps 16 are bent over the larger ends of the rollers, preferably so as to exert a slight resilient pressure in the axial direction on the roller.

Figure 2:
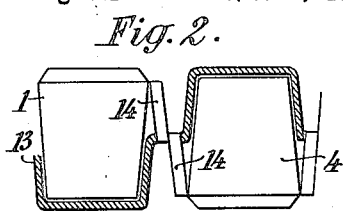
Fig. 2 is a plan of the roller cage, partly in section.

The roller cage shown in Fig. 6 comprises, as the roller cage shown in Figs. 1 and 2, an annular folded ribbon 33, the folds of which receive the rollers, which engage the said folds with their smaller ends. Projecting from those parts 34 of the roller cage situated along said ends of the rollers are tongues 35 bent to conform with the larger, conical ends of the rollers so as to maintain the latter in their respective places.

It should be understood that the roller cages shown are referred to by way of example only, and that the construction and arrangement of the cages may be varied in many ways.

Figure 7:
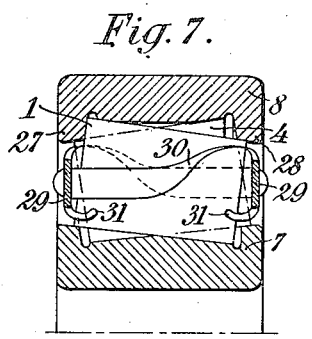
Fig. 7 shows an embodiment of the bearing in which the rollers bear at one end against the outer ring, and at the other end against the inner ring.

In Fig. 7 a modified form of the bearing is shown in which the rollers bear with their ends against each of the bearing rings. Formed on the outer ring are two side-flanges 27, 28, each corresponding to one of the rows of rollers, and serving to prevent axial displacement of the rollers. The roller cage is formed by two sheet metal rings 29 connected by tongues 30, each of which extends between two adjacent rollers and is riveted to the opposite ring. Furthermore tongues 31 may be formed on the one edge, preferably the inner edge, of the ring, said tongues projecting between and engaging the rollers.

Also in the embodiment last described use may be made, if desired, of a so-called Timken-type guide comprising, for instance a flange at the mid-section of one of the race rings.

Figure 9:
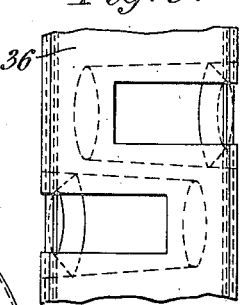
Fig. 9 is a side elevation of the same roller cage.

In the embodiment shown in Figs. 8 and 9, the roller cage comprises a solid ring 36 having conical borings for the rollers formed in both of its end surfaces. For securing the rollers in place I may use sheet metal covers 37 (Figs. 10 and 11) engaging in peripheral grooves formed at the outer edges of the ball cage ring. To this end sheet metal cover 37 may be manufactured with a greater taper than its final form, as shown by full lines in Fig. 10. The covers, when placed in their proper positions, are then pressed by means of any suitable tool against the sides of the ball cage to the shape shown in dotted lines, so as to be caused to engage the said peripheral grooves. The roller cage may also be formed without sheet metal covers, as shown in Fig. 12.

It is evident that the bearing and cage may be further modified in many ways without departing from the principle of the invention.

In addition to the conical rollers shown, the bearing may also have cylindrical rollers, alternated with the conical rollers, according to any of the arrangements set forth in my said application Serial No. 322,753, filed September 9, 1919. In any such case the cage will be modified in the obvious way to engage the respective rollers.

What I claim is:—

1. In a roller bearing, an inner ring, an outer ring, and rows of rollers interposed between said rings, the successive rollers alternating between said rows, the said rings having separate races for each row of rollers, the races for one row alternating axially with the races for another row in such a way that each roller bears against one ring at both of its ends and against the other ring between its ends, combined with a roller cage having successive portions engaging alternately the rollers of the respective rows to hold them in position.

2. In a roller bearing, an inner ring, an outer ring, and rows of rollers interposed between said rings, the said rings having separate races for each row of rollers, the races for one row alternating axially with the races for another row in such a way that each roller bears against one ring at both of its ends and against the other ring between its ends, combined with a roller cage having portions engaging the respective rollers to hold them spaced apart, and to hold the rollers of the respective rows with their axes converging to a common apex.

3. In a roller bearing, comprising an inner ring, an outer ring, and rows of rollers interposed between said rings, the rings being formed with separate races for each row of rollers, the races for one row alternately axially with the races for another row, a roller cage consisting of an annular folded ribbon, the folds of which are adapted to receive the ends of the rollers.

4. In a roller bearing, an inner ring, an outer ring, rows of rollers interposed between said rings, the rings being formed with separate races for each row of rollers, the races for one row alternating axially with the races for another row, a roller cage, consisting of an annular, folded ribbon, the folds of which are adapted to receive the ends of the rollers, having tongues formed on the edges of the folded ribbon, said tongues being bent so as to constitute auxiliary means for holding the rollers.

5. In a roller bearing, an inner ring, an outer ring, rows of rollers interposed between said rings, the rings being formed with separate races for each row of rollers, the races for one row alternating axially with the races for another row, a roller cage, consisting of an annular, folded ribbon, the folds of which are adapted to receive the ends of the rollers, with tongues formed on the edges of the folded ribbon, said tongues being bent around the outer ends of the rollers.

6. In a roller bearing, an inner ring, an outer ring, rows of rollers interposed between said rings, the rings being formed with separate races for each row of rollers, the races for one row alternating axially with the races for another row, a roller cage, consisting of an annular, folded ribbon, the folds of which are adapted to receive the ends of the rollers, with tongues formed on the ribbon adjacent to one end of the rollers and bent over the other ends of the rollers.

In witness whereof, I have hereunto signed my name.

SVEN GUSTAF WINGQUIST.